(12) United States Patent
Li (10) Patent No.: US 9,963,621 B2
(45) Date of Patent: May 8, 2018

(54) MANUFACTURING METHOD OF QUANTUM DOT GLUE, QUANTUM DOT GLUE AND QUANTUM DOT POLARIZER

(71) Applicant: Shenzhen China Star Optoelectronics Technology Co., Ltd., Shenzhen (CN)

(72) Inventor: Dongze Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 197 days.

(21) Appl. No.: 15/106,317

(22) PCT Filed: May 25, 2016

(86) PCT No.: PCT/CN2016/083386
§ 371 (c)(1),
(2) Date: Jun. 20, 2016

(87) PCT Pub. No.: WO2017/190387
PCT Pub. Date: Nov. 9, 2017

(65) Prior Publication Data
US 2018/0100090 A1  Apr. 12, 2018

(30) Foreign Application Priority Data
May 3, 2016 (CN) .......................... 2016 1 0288701

(51) Int. Cl.
| | |
|---|---|
| *C09J 11/04* | (2006.01) |
| *C09J 129/04* | (2006.01) |
| *G02B 5/30* | (2006.01) |
| *G02F 1/1335* | (2006.01) |
| *B82Y 20/00* | (2011.01) |

(52) U.S. Cl.
CPC .............. *C09J 129/04* (2013.01); *B82Y 20/00* (2013.01); *C09J 11/04* (2013.01); *G02B 5/30* (2013.01); *G02F 1/133528* (2013.01); *G02B 2207/101* (2013.01)

(58) Field of Classification Search
CPC ........... C09J 11/00; C09J 129/04; G02B 5/30; G02B 5/305; G02B 2207/101; G02F 1/133528; B82Y 20/00
USPC ............................................ 430/321; 349/96
See application file for complete search history.

(56) References Cited

U.S. PATENT DOCUMENTS

2016/0085102 A1* 3/2016 Ohmuro ................. G02B 5/305
                                                                    349/61
2017/0256686 A1* 9/2017 Li ......................... H01L 33/507

FOREIGN PATENT DOCUMENTS

| CN | 104536078 A | | 4/2015 |
|---|---|---|---|
| JP | 2013-101251 A | * | 5/2013 |
| WO | WO 2015/095296 A1 | * | 6/2015 |

OTHER PUBLICATIONS

Computer-generated translation of JP 2013-101251 (May 2013).*

* cited by examiner

*Primary Examiner* — John A McPherson
(74) *Attorney, Agent, or Firm* — Leong C. Lei (57) ABSTRACT

The invention provides a manufacturing method of a quantum dot glue, a quantum dot glue and a quantum dot polarizer. In the manufacturing method, a polyvinyl alcohol glue is added with water-soluble quantum dot materials, and an alkaline solution is used to adjust its pH value to be above 7, so that a quantum dot glue is obtained, the manufacturing process is simple and the obtained quantum dot glue can be used for fabricating a quantum dot polarizer. The quantum dot polarizer is provided with a quantum dot glue layer formed by coating the quantum dot glue, since the quantum dot glue itself is alkaline, an alkali treatment process applied to a bonded layer is eliminated and thus can be directly coated, so that the manufacturing process is simplified. Moreover, since it is added with quantum dot materials, color gamut and display quality of display device can be improved.

10 Claims, 5 Drawing Sheets

MANUFACTURING METHOD OF QUANTUM DOT GLUE, QUANTUM DOT GLUE AND QUANTUM DOT POLARIZER

TECHNICAL FIELD

The invention relates to the field of display technology, and more particularly to a manufacturing method of a quantum dot glue, a quantum dot glue and a quantum dot polarizer.

DESCRIPTION OF RELATED ART

With the development of display technology, flat panel display devices such as liquid crystal display (LCD) devices are widely used in various consumer electronic products such as mobile phones, televisions, personal digital assistants, digital cameras, notebook computers and desktop computers owing to their advantages of high image quality, energy-saving, slim body, wide application range and so on, and thus have become the mainstream of display devices.

For the current LCD field, the main problem expected to be solved is how to meet the market demand of the products with high color gamut and high color saturation.

A quantum dot material has the advantages of highly concentrated emission spectrum and high color purity, and therefore by using these advantages, it can greatly improve color gamut of the current LCD devices and increase color reproduction capability of the LCD devices, and the currently commercially available quantum dot TV is the best embodiment of the material being applied in the field of display. The prior art mainly focuses on mixing and encapsulating quantum dots with light-emitting wavelengths at R(red), G(green) and B(blue) into an engineering plastic film (termed as QD film) or a glass tube (termed as QD tube), placing the resultant QD structure at a location between a backlight and a display system, and using the traditional white backlight to excitate it so as to achieve the purpose of enriching color gamut. However, regardless of the QD film structure or the QD tube structure, the way of using the quantum dot material is relatively simple, and meanwhile since it needs the protection and encapsulation of an optically high-quality polyethylene terephthalate (PET) film or a small-aperture glass tube, there is the problems of high cost and material reliability in some degrees.

Figure 1:
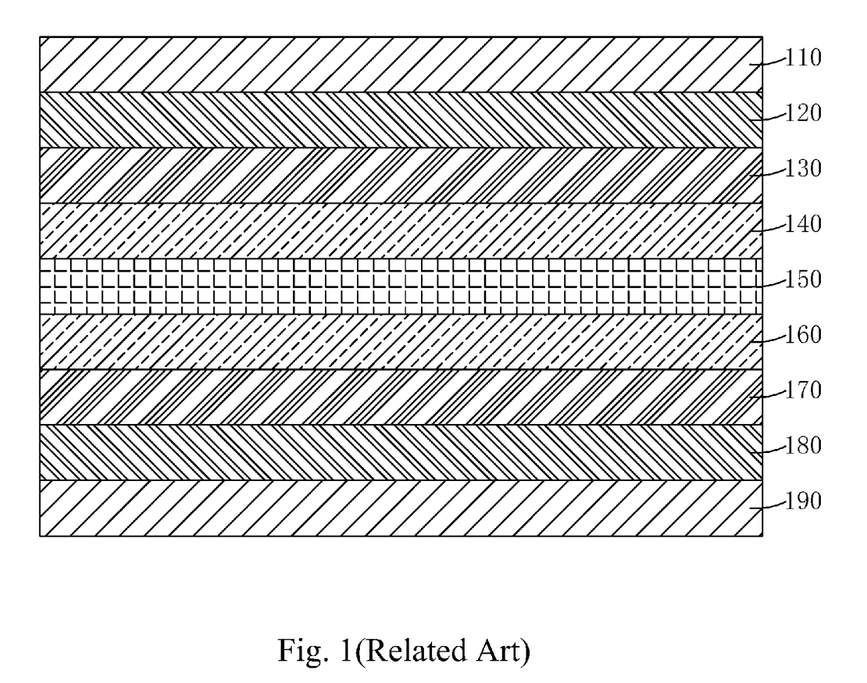
FIG. 1 is a schematic structural view of a conventional polarizer.

In the field of LCD display, a polarizer has an irreplaceable important role, and polarization optics is the basis of liquid crystal display. Referring to FIG. 1, which is a schematic structural view of a conventional polarizer. The polarizer includes a surface protective film 110, a first pressure-sensitive adhesive (PSA) layer 120, a first protective layer 130, a first polyvinyl alcohol (PVA) glue layer 140, a polarizing film 150, a second polyvinyl alcohol glue layer 160, a second protective layer 170, a second pressure-sensitive adhesive layer 180 and a release film 190 sequentially arranged from top to bottom. Specifically, before the polarizing film is pasted on a liquid crystal display panel, the release film 190 will be torn off to expose the second pressure-sensitive adhesive layer 180, and then the polarizer is pasted on the liquid crystal display panel by the second pressure-sensitive adhesive layer 180.

The polarizing film 150 is the core part of the polarizer, and a material thereof generally is a polyvinyl alcohol layer containing iodine molecules. However, the polyvinyl alcohol is easily hydrolyzed, so that in order to protect the physical characteristics of the polarizing film 150, two sides of the polarizing film 150 respectively are combined with the first protective layer 130 and the second protective layer 170 for protection. The first protective layer 130 and the second protective layer 170 each are a cellulose triacetate (TAC) film having highly light transmittance, good water resistance and a certain mechanical strength. The polarizing film 150 and the first protective layer 130 are bonded together by the first polyvinyl alcohol glue layer 140, the polarizing film 150 and the second protective layer 170 are bonded together by the second polyvinyl alcohol glue layer 160. The first polyvinyl alcohol glue layer 140 and the second polyvinyl alcohol glue layer 160 each are formed by coating a polyvinyl alcohol glue, in general, when the polyvinyl alcohol glue is used to bond the polarizing film 150 with the first protective layer 130 and the second protective layer 170 together, it is needed to perform an alkali treatment for surfaces of the first and second protective layers 130, 170 contacted with the PVA glue by a strong alkali, so as to improve their surface hydrophilic properties, and a chemical reaction formula is as following:

The first and second protective layers 130, 170 are exposed with hydroxyl groups at their surfaces after the alkali treatment, and thus are easy to occur intermolecular hydrogen bonding with the PVA glue to reduce the contact angle and enhance the bonding strength. However, due to the additional alkali treatment process, which makes the production process of the polarizer be complicated, the process time is prolonged and the production cost is increased.

SUMMARY

An objective of the invention is to provide a manufacturing method of a quantum dot glue, of which the process is simple, the obtained quantum dot glue can be used for fabricating a quantum dot polarizer and simplify the production process of the quantum dot polarizer.

Another objective of the invention is to provide a quantum dot glue, which can be used for making a quantum dot polarizer, simplify the production process of the quantum dot polarizer and improve color gamut and display quality of display device.

Still another objective of the invention is to provide a quantum dot polarizer, of which a manufacturing process is simple, and it can be applied into a liquid crystal display device for improving color gamut and display quality.

In order to achieve the above objectives, the invention firstly provides a manufacturing method of a quantum dot glue, which includes following steps of:

step 1: providing a water-soluble red quantum dot material, a water-soluble green quantum dot material and a polyvinyl alcohol glue, making the water-soluble red quantum dot material, the water-soluble green quantum dot material and the polyvinyl alcohol glue be mixed together and uniformly dispersed, and thereby obtaining a quantum dot glue mixture; and step 2: adding an alkaline solution into the quantum dot mixture to adjust a pH value thereof to be above 7, and thereby obtaining a quantum dot glue.

In an embodiment, the water-soluble red quantum dot material includes a red quantum dot and a water-soluble ligand disposed on a surface of the red quantum dot; the water-soluble green quantum dot material includes a green quantum dot and a water-soluble ligand disposed on a surface of the green quantum dot.

The red quantum dot includes a first core in the middle and a first shell coating the first core, a material of the first core includes one or more than one of CdSe, $Cd_2SeTe$ and InAs; a material of the first shell includes one or more than one of CdS, ZnSe, $ZnCdS_2$, ZnS and ZnO.

The green quantum dot includes a second core in the middle and a second shell coating the second core, a material of the second core includes one or more than one of $ZnCdSe_2$, InP and $Cd_2SSe$; a material of the second shell includes one or more than one of CdS, ZnSe, $ZnCdS_2$, ZnS and ZnO.

The water-soluble ligand includes one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron, and glutathione (GSH).

The alkaline solution includes one or more than one of an ethylenediamine aqueous solution, a triethanolamine aqueous solution, a trimethylamine aqueous solution, a diphenylamine aqueous solution, a hexamethylene tetramine aqueous solution and a tetramethylammonium hydroxide aqueous solution.

In the quantum dot glue obtained by step 2, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of polyvinyl alcohol is 2 wt %~10 wt %.

The invention further provides a quantum dot glue including a water-soluble red quantum dot material, a water-soluble green quantum dot material, a polyvinyl alcohol, an alkaline compound and water. A pH value of the quantum dot glue is greater than 7.

In an embodiment, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %.

The water-soluble red quantum dot material includes a red quantum dot and a water-soluble ligand disposed on a surface of the red quantum dot, the water-soluble green quantum dot material includes a green quantum dot and a water-soluble ligand disposed on a surface of the green quantum dot.

The red quantum dot includes a first core in the middle and a first shell coating the first core, a material of the first core includes one or more than one of CdSe, $Cd_2SeTe$ and InAs, a material of the first shell includes one or more than one of CdS, ZnSe, $ZnCdS_2$, ZnS and ZnO.

The green quantum dot includes a second core in the middle and a second shell coating the second core, a material of the second core includes one or more than one of $ZnCdSe_2$, InP and $Cd_2SSe$, a material of the second shell includes one or more than one of CdS, ZnSe, ZnCdS2, ZnS and ZnO.

The water-soluble ligand includes one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron, and glutathione.

The alkaline compound includes one or more than one of ethylenediamine, triethanolamine, trimethylamine, diphenylamine, hexamethylene tetramine and tetramethylammonium hydroxide.

The invention still further provides a quantum dot polarizer including a quantum dot glue layer. The quantum dot glue layer is formed by coating a quantum dot glue. The quantum dot glue includes a water-soluble red quantum dot material, a water-soluble green quantum dot material, a polyvinyl alcohol, an alkaline compound and water. A pH value of the quantum dot glue is greater than 7.

In an embodiment, the quantum dot polarizer includes a surface protective film, a first pressure-sensitive adhesive layer, a first protective layer, the quantum dot glue layer, a polarizing film, an adhesive layer, a second protective layer, a second pressure-sensitive adhesive layer and a release film sequentially arranged from top to bottom.

In an embodiment, the quantum dot polarizer includes a surface protective film, a first pressure-sensitive adhesive layer, a first protective layer, the quantum dot glue layer, a first adhesive layer, a polarizing film, a second adhesive layer, a second protective layer, a second pressure-sensitive adhesive layer and a release film sequentially arranged from top to bottom.

In an embodiment, the quantum dot polarizer includes a surface protective film, a first pressure-sensitive adhesive layer, a third protective layer, the quantum dot glue layer, a first protective layer, a first adhesive layer, a polarizing film, a second adhesive layer, a second protective layer, a second pressure-sensitive adhesive layer and a release film sequentially arranged from top to bottom.

In an embodiment, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %.

Moreover, the water-soluble red quantum dot material includes a red quantum dot and a water-soluble ligand disposed on a surface of the red quantum dot, the water-soluble green quantum dot material includes a green quantum dot and a water-soluble ligand disposed on a surface of the green quantum dot.

The red quantum dot includes a first core in the middle and a first shell coating the first core, a material of the first core includes one or more than one of CdSe, $Cd_2SeTe$ and InAs, a material of the first shell includes one or more than one of CdS, ZnSe, $ZnCdS_2$, ZnS and ZnO.

The green quantum dot includes a second core in the middle and a second shell coating the second core, a material of the second core includes one or more than one of $ZnCdSe_2$, InP and $Cd_2SSe$, a material of the second shell includes one or more than one of CdS, ZnSe, $ZnCdS_2$, ZnS and ZnO.

The water-soluble ligand includes one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron, and glutathione.

The alkaline compound includes one or more than one of ethylenediamine, triethanolamine, trimethylamine, diphenylamine, hexamethylene tetramine and tetramethylammonium hydroxide.

In an embodiment, a thickness of the quantum dot glue layer is 0.5 μm~200 μm.

Efficacy can be achieved by the invention is that: the manufacturing method of a quantum dot glue associated with the invention, by adding water-soluble quantum dot materials into a polyvinyl alcohol glue and using an alkaline solution to adjust a pH value thereof to be above 7, a quantum dot glue can be obtained, the manufacturing process is simple, and the obtained quantum dot glue can be used for fabricating a quantum dot polarizer. Moreover, the quantum dot polarizer associated with the invention is provided with a quantum dot glue layer formed by coating the quantum dot glue, since the quantum dot glue itself is alkaline, an alkali treatment process applied to a to-be-bonded layer can be eliminated and thus it can be directly coated, as a result the manufacturing process of the quantum dot polarizer is simplified. In addition, since it is added with quantum dot materials, color gamut and display quality of a display device to which the quantum dot polarizer is applied can be improved consequently.

In order to further understand the features and technical contents of the invention, please refer to the following detailed description and accompanying drawings of the invention. However, the drawings are merely for reference and illustration, but not used to restrict the invention.

BRIEF DESCRIPTION OF THE DRAWINGS

The above and other aspects, features and advantages of embodiments of the invention will be more apparent from the following detailed description taken in conjunction with the accompanying drawings, in which.

DETAILED DESCRIPTION OF EMBODIMENTS

In order to make objectives, technical solutions and advantages of the invention become more apparent, various embodiments of the invention will be described in detail below with reference to accompanying drawings. Examples of these preferred embodiments would be illustrated in the drawings. The illustration in the drawings and the embodiments of the invention described according to the accompanying drawings only are exemplary, and the invention is not limited to these embodiments.

Figure 2:
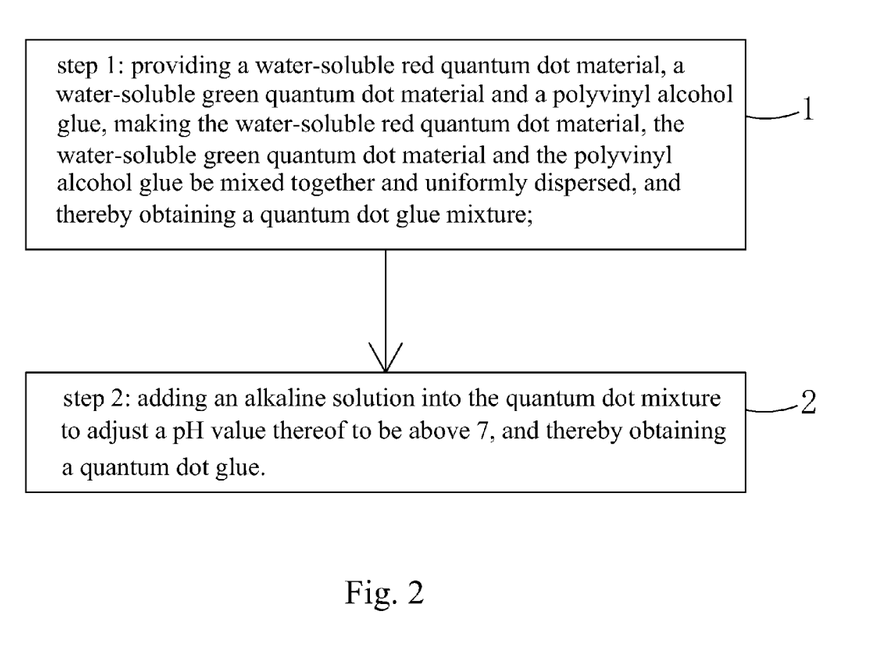
FIG. 2 is a flowchart of a manufacturing method of a quantum dot glue according to the invention.

Please refer to FIG. 2, the invention firstly provides a manufacturing method of a quantum dot glue, which includes the following steps.

Step 1: providing a water-soluble red quantum dot, a water-soluble green quantum dot and a polyvinyl alcohol glue, making the water-soluble red quantum dot material, the water-soluble green quantum dot material and the polyvinyl alcohol glue be mixed together and uniformly dispersed, and thereby obtaining a quantum dot glue mixture.

Specifically, the water-soluble red quantum dot material includes a red quantum dot and a water-soluble ligand disposed on a surface of the red quantum dot. The water-soluble green quantum dot material includes a green quantum dot and a water-soluble ligand disposed on a surface of the green quantum dot.

Preferably, the red quantum dot and the green quantum dot each are a quantum dot with a core-shell structure.

In particular, the red quantum dot includes a first core in the middle and a first shell coating the first core. A material of the first core includes one or more than one of CdSe, $Cd_2SeTe$, and InAs. A material of the first shell includes one or more than one of CdS, ZnSe, $ZnCdS_2$, ZnS, and ZnO.

The green quantum dot includes a second core in the middle and a second shell coating the second core. A material of the second core includes one or more than one of $ZnCdSe_2$, InP and $Cd_2SSe$. A material of the second shell includes one or more than one of CdS, ZnSe, $ZnCdS_2$, ZnS, and ZnO.

The water-soluble ligand includes one or more than one of mercaptoacetic acid, 3-Mercaptopropionic acid, cysteine, mercaptoundecanoic acid, mercaptoalkyl oligo(ethylene glycol)carboxylic acid, suger-funtionalized thiol, a G2-OH Dendron, and glutathione (GSH).

The structural formula of mercaptoacetic acid is the structural formula of 3-mercaptopropionic acid is the structural formula of cysteine is the structural formula of mercaptoundecanoic acid is the structural formula of mercaptoalkyl oligo(ethylene glycol)carboxylic acid is the structural formula of suger-funtionalized thiol is the structural formula of G2-OH Dendron is and the structural formula of glutathione is The PVA glue includes a polyvinyl alcohol and water, and a mass percentage of the polyvinyl alcohol is 4 wt %~12 wt %.

Step 2: adding an alkaline solution into the quantum dot glue mixture to adjust a pH value thereof to be above 7 and thereby obtaining a quantum dot glue.

Specifically, in the quantum dot glue obtained by the step 2, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 20:1~1:20, and a mass percentage of the polyvinyl alcohol is 2 wt %~10 wt %.

In particular, the alkaline solution includes one or more than one of an ethylenediamine aqueous solution, a triethanolamine aqueous solution, a trimethylamine aqueous solution, a diphenylamine solution, a hexamethylene tetramine aqueous solution and a tetramethylammonium hydroxide aqueous solution.

Based on the above-mentioned manufacturing method of a quantum dot glue, the invention further provides a quantum dot glue including a water-soluble red quantum dot material, a water-soluble green quantum dot material, a polyvinyl alcohol, an alkaline compound and water, and a pH value of the quantum dot glue is greater than 7.

In the quantum dot glue, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %.

The water-soluble red quantum dot material includes a red quantum dot and a water-soluble ligand on a surface of the red quantum dot. The water-soluble green quantum dot material includes a green quantum dot and a water-soluble ligand on a surface of the green quantum dot.

Preferably, the red quantum dot and the green quantum dot each are a quantum dot with a core-shell structure.

More specifically, the red quantum dot includes a first core in the middle and a first shell disposed surrounding around the first core. A material of the first core includes one or more than one of CdSe, $Cd_2SeTe$ and InAs. A material of the first shell includes one or more than one of CdS, ZnSe, $ZnCdS_2$, ZnS and ZnO.

The green quantum dot includes a second core in the middle and a second shell disposed surrounding around the second core. A material of the second core includes one or more than one of $ZnCdSe_2$, InP and $Cd_2SSe$. A material of the second shell includes one or more than one of CdS, ZnSe, $ZnCdS_2$, ZnS and ZnO.

The water-soluble ligand includes one or more than one of mercaptoacetic acid, 3-Mercaptopropionic acid, cysteine, mercaptoundecanoic acid, mercaptoalkyl oligo(ethylene glycol)carboxylic acid, suger-funtionalized thiol, G2-OH Dendron and glutathione. The structural formulas of the various compounds have been described in detail above, and thus will not be repeated herein.

The alkaline compound includes one or more than one of ethylenediamine, triethanolamine, trimethylamine, diphenylamine, hexamethylene tetramine and tetramethylammonium hydroxide.

Figure 3:
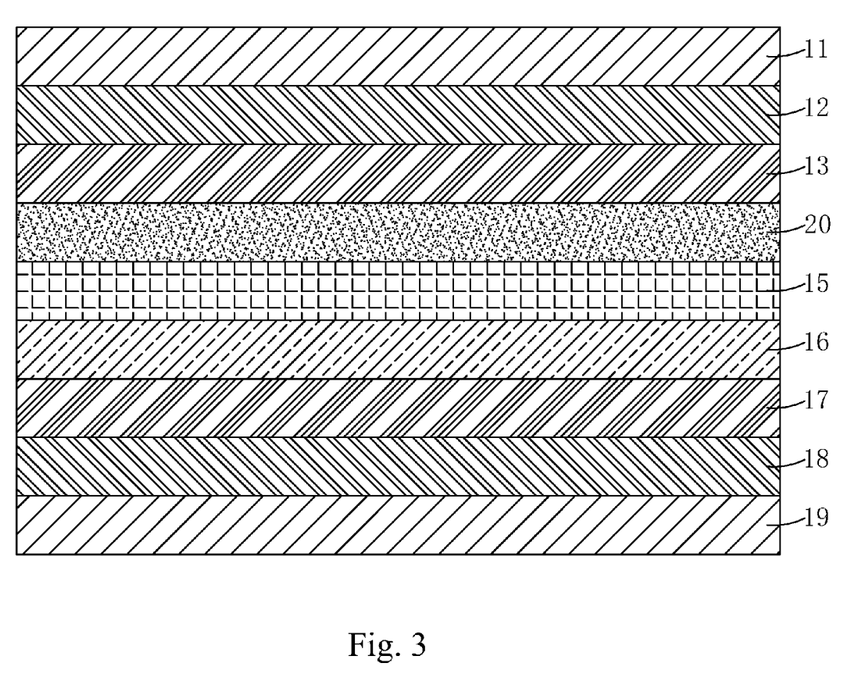
FIG. 3 is a schematic structural view of a quantum dot polarizer according to a first embodiment of the invention.

Please refer to FIG. 3, based on the above quantum dot glue, the invention still further provides a quantum dot polarizer including a surface protective film 11, a first pressure-sensitive adhesive layer 12, a first protective layer 13, a quantum dot glue layer 20, a polarizing film 15, an adhesive layer 16, a second protective layer 17, a second pressure-sensitive adhesive layer 18 and a release film 19 sequentially arranged from top to bottom.

The quantum dot glue layer 20 is formed by coating a quantum dot glue. The quantum dot glue includes a water soluble red quantum dot material, a water soluble green quantum dot material, a polyvinyl alcohol, an alkaline compound and water, and a pH value of the quantum dot glue is greater than 7.

Specifically, in the quantum dot glue, a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %.

The water-soluble red quantum dot material includes a red quantum dot and a water-soluble ligand on a surface of the red quantum dot. The water-soluble green quantum dot material includes a green quantum dot and a water soluble ligand on a surface of the green quantum dot.

Preferably, the red quantum dot and the green quantum dot each are a quantum dot with a core-shell structure.

The red quantum dot includes a first core in the middle and a first core coating the first core. A material of the first core includes one or more than one of CdSe, $Cd_2SeTe$, and InAs. A material of the first shell includes one or more than one of CdS, ZnSe, ZnCdS$_2$, ZnS and ZnO.

The green quantum dot includes a second core in the middle and a second shell coating the second core. A material of the second core includes one or more than one of ZnCdSe$_2$, InP, and Cd$_2$SSe. A material of the second shell includes one or more than one of CdS, ZnSe, ZnCdS$_2$, ZnS and ZnO.

The water-soluble ligand includes one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron and glutathione. The structural formulas of the various compounds have been described in detail above, and thus will not be repeated herein.

The alkaline compound includes one or more than one of ethylenediamine, triethanolamine, trimethylamine, diphenylamine, hexamethylene tetramine and tetramethylammonium hydroxide.

A thickness of the quantum dot glue layer 20 is 0.5 μm~200 μm.

Specifically, the polarizing film 15 is a polyvinyl alcohol film containing iodine molecules. The adhesive layer 16 is a polyvinyl alcohol glue layer, and the polyvinyl alcohol glue layer is formed by coating a polyvinyl alcohol glue. The first protective layer 13 and the second protective layer 17 each are a cellulose triacetate film. The cellulose triacetate film has the advantages of highly light transmittance, good water resistance and certain mechanical strength, and thus can protect the polarizing film 15.

The above described quantum dot polarizer, by using the quantum dot glue layer 20 to replace the traditional polyvinyl alcohol glue layer, since the quantum dot glue layer 20 itself is alkaline, an alkali treatment process for the first protective layer 13 can be eliminated and thus it can be directly coated, so that the manufacturing process is simplified. Meanwhile, the quantum dot glue layer 20 is added with quantum dot materials, the color gamut and display quality of a display device adopting the quantum dot glue layer 20 can be improved.

Figure 4:
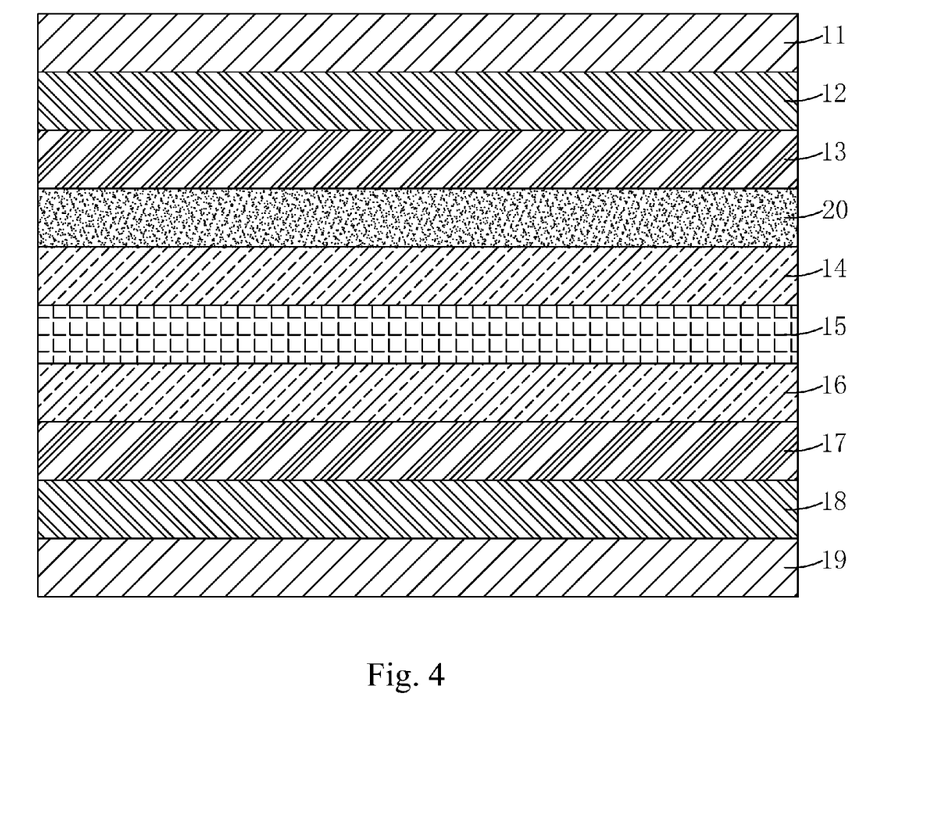
FIG. 4 is a schematic structural view of a quantum dot polarizer according to a second embodiment of the invention.

Please refer to FIG. 4, based on the above described quantum dot glue, the invention further provides another kind of quantum dot polarizer including a surface protective film 11, a first pressure sensitive-adhesive layer 12, a first protective layer 13, a quantum dot glue layer 20, a first adhesive layer 14, a polarizing film 15, a second adhesive layer 16, a second protective layer 17, a second pressure-sensitive adhesive layer 18 and a release film 19 sequentially arranged from top to bottom.

The quantum dot glue layer 20 is formed by coating a quantum dot glue, and the quantum dot glue includes a water-soluble red quantum dot material, a water-soluble green quantum dot material, a polyvinyl alcohol, an alkaline compound and water, and further a pH value of the quantum dot glue is great than 7.

Amounts and materials of various components/ingredients in the quantum dot glue are the same as that of the above embodiment, and thus will not be repeated herein.

A thickness of the quantum dot glue layer is 0.5 μm~200 μm.

The polarizing film 15 is a polyvinyl alcohol film containing iodine molecules. The first adhesive layer 14 and the second adhesive layer 16 each are a polyvinyl alcohol glue layer, and the polyvinyl alcohol glue layer is formed by coating a polyvinyl alcohol glue. The first protective layer 13 and the second protective layer 17 each are a cellulose triacetate film.

The above quantum dot polarizer, by adding the quantum dot glue layer 20 between the first protective layer 13 and the first adhesive layer 14, since the quantum dot glue layer 20 itself is alkali, an alkali treatment process for the first protective layer 13 is eliminated and thus it can be coated directly, so that the manufacturing process is simplified. Meanwhile, by using two layers of the quantum dot glue layer 20 and the first adhesive layer 14 to bond the first protective layer 13 with the polarizing film 15 together, the bonding effect between the first protective layer 13 and the polarizing film 15 is enhanced. In addition, by adding with quantum dot materials, color gamut and display quality of a display device employing the quantum dot polarizer can be improved.

Figure 5:
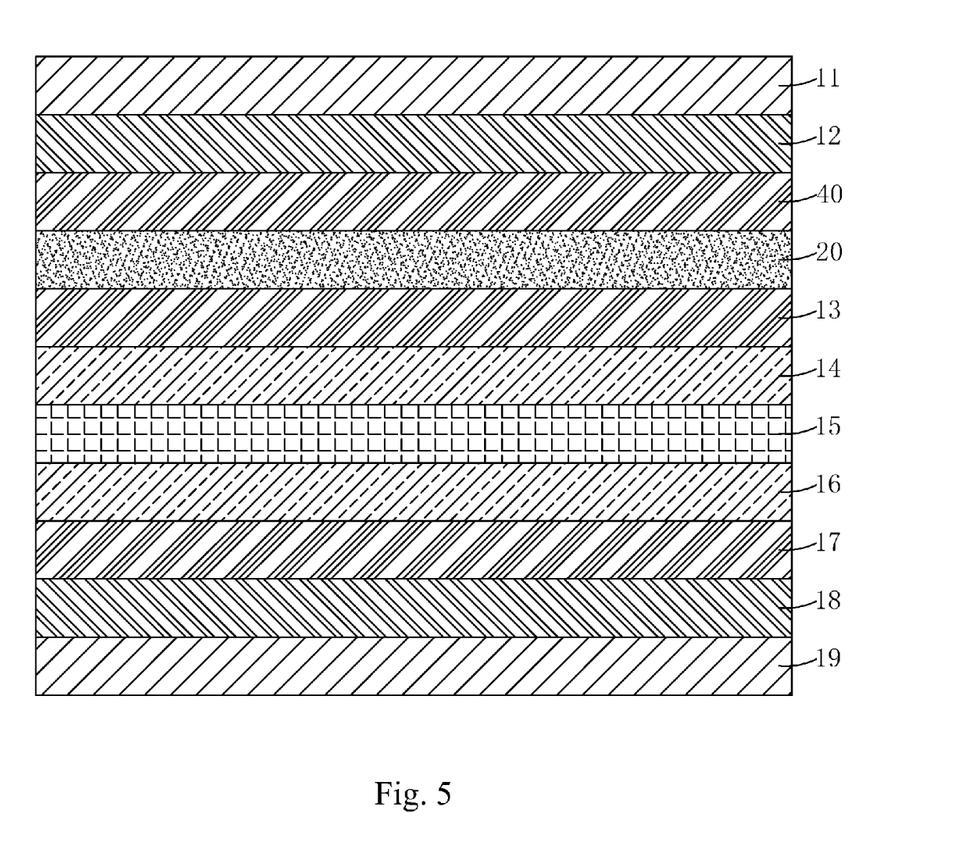
FIG. 5 is a schematic structural view of a quantum dot polarizer according to a third embodiment of the invention.

Please refer to FIG. 5, based on the above described quantum dot glue, the invention still further provides a quantum dot polarizer including a surface protective film 11, a first pressure-sensitive adhesive layer 12, a third protective layer 40, a quantum dot glue layer 20, a first protective layer 13, a first adhesive layer 14, a polarizing film 15, a second adhesive layer 16, a second protective layer 17, a second pressure-sensitive layer 18 and a release film 19 sequentially arranged from top to bottom.

The quantum dot glue layer 20 is formed by coating a quantum dot glue. The quantum dot glue includes a water-soluble red quantum dot material, a water-soluble green quantum dot material, a polyvinyl alcohol, alkali compound and water, and a pH value of the quantum dot glue is greater than 7.

Amounts and materials of components/ingredients in the quantum dot glue are the same as that of the above embodiment, and thus will not be repeated herein.

A thickness of the quantum dot glue layer 20 is 0.5 μm~200 μm.

The polarizing film 15 is a polyvinyl alcohol film containing iodine molecules. The first adhesive layer 14 and the second adhesive layer 16 each are a polyvinyl alcohol glue layer, and the polyvinyl alcohol glue layer is formed by coating a polyvinyl alcohol glue. The first protective layer 13, the second protective layer 17 and the third protective layer 40 each are a cellulose triacetate film.

Compared with the traditional polarizer, the above described quantum dot polarizer is added with the third protective layer 40, so that the protection for the polarizing film 15 is enhanced and the quality of polarizer is improved. Meanwhile, by using the quantum dot glue layer 20 to bond the third protective layer 40 with the first protective layer 13 together, since the quantum dot glue layer 20 itself is alkaline, an alkali treatment process for the third protective layer 40 as well as the first protective layer 13 is eliminated, and thus the quantum dot glue layer 20 can be directly coated, so that the manufacturing process is simplified. Moreover, by adding with quantum dot materials, the color gamut and display quality of a display device using the quantum dot polarizer can be improved.

In particularly, in the quantum dot polarizers associated with the above three embodiments, the first protective layer 13 and the second protective layer 17 (even the third protective layer 40) are used to protect the polarizing film 15, the outermost surface protective film 11 and the release film 19 are used to provide overall chemical and mechanical protection for the quantum dot polarizer. When in use, the release film 19 is torn off to expose the second pressure-sensitive adhesive layer 18, and then the quantum dot polarizer is pasted on a liquid crystal display panel by the second pressure-sensitive layer 18.

The quantum dot polarizer of the invention can be applied as an upper polarizer (color filter substrate polarizer) or a lower polarizer (array substrate polarizer) of a liquid crystal display panel. Preferably, when it is applied as the lower polarizer of the liquid crystal display panel and used in conjunction with a blue backlight, under the irradiation of the blue backlight, red and green lights emitted from the red and green quantum dots in the quantum dot polarizer would be mixed with the unabsorbed blue light to form a white light, and thereby the liquid crystal display panel is provided with a high purity white light source, so that the display quality of the liquid crystal display panel can be improved. Furthermore, the quantum dot polarizer can be used in conjunction with other colored backlight to improve the color gamut of liquid crystal display panel.

Based on the use of the quantum dot polarizer as the lower polarizer, in the three embodiments of the invention, the quantum dot glue layer 20 is disposed on a side of the polarizing film 15 away from the release film 19, so as to ensure that the quantum dot layer 20 does not affect the polarized light passing through the polarizing film 15.

In summary, the invention provides a manufacturing method of a quantum dot glue, a quantum dot glue and a quantum dot polarizer. For the manufacturing method of a quantum dot glue of the invention, by adding water soluble quantum dot materials in the PVA glue and using an alkaline solution to adjust its pH value to be above 7, a quantum dot glue is obtained, the manufacturing process is simple, and the obtained quantum dot glue can be used for fabricating a quantum dot polarizer. The quantum dot polarizer associated with the invention is added with a quantum dot glue layer formed by coating a quantum dot glue, since the quantum dot itself is alkaline, an alkali treatment process for the to-be-bonded layer is eliminated and thus it can be directly coated, so that the manufacturing process of a quantum dot polarizer is simplified consequently. Moreover, by adding with quantum dot materials, the color gamut and display quality of a display device adopting the quantum dot polarizer can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a quantum dot glue, comprising following steps of:
    step 1: providing a water-soluble red quantum dot material, a water-soluble green quantum dot material and a polyvinyl alcohol glue, making the water-soluble red quantum dot material, the water-soluble green quantum dot material and the polyvinyl alcohol glue be mixed together and uniformly dispersed, and thereby obtaining a quantum dot glue mixture;
    step 2: adding an alkaline solution into the quantum dot glue mixture to adjust a pH value thereof to be above 7 and thereby obtaining a quantum dot glue.

2. The manufacturing method of a quantum dot glue according to claim 1, wherein the water-soluble red quantum dot material comprises a red quantum dot and a water-soluble ligand located at a surface of the red quantum dot; the water-soluble green quantum dot material comprises a green quantum dot and a water-soluble ligand located at a surface of the green quantum dot;
    wherein the red quantum dot comprises a first core in the middle and a first shell surrounding around the first core, a material of the first core comprises one or more than one of CdSe, $Cd_2SeTe$ and InAs, a material of the first shell comprises one or more than one of CdS, ZnSe, $ZnCdS_2$, ZnS and ZnO;
    wherein the green quantum dot comprises a second core in the middle and a second shell surrounding around the second core, a material of the second core comprises one or more than one of $ZnCdSe_2$, InP and $Cd_2SSe$, a material of the second shell comprises one or more than one of CdS, ZnSe, $ZnCdS_2$, ZnS and ZnO;
    wherein the water-soluble ligand comprises one or more than one of mercaptoacetic acid, 3-mercaptopropionic acid, cysteine, mercaptoundecanoic acid, mercaptoalkyl oligo(ethylene glycol)carboxylic acid, sugerfuntionalized thiol, G2-OH Dendron and glutathione;
    wherein the alkaline solution comprises one or more than one of an ethylenediamine aqueous solution, a triethanolamine aqueous solution, a trimethylamine aqueous solution, a diphenylamine aqueous solution, a hexamethylene tetramine aqueous solution and a tetramethylammonium hydroxide aqueous solution;
    wherein in the quantum dot glue obtained in the step 2, a mass percentage of the water-soluble red quantum dot material and the water-soluble green quantum dot material in total is 0.5 wt %~20 wt %, a mass ratio of the water-soluble red quantum dot material to the water-soluble green quantum dot material is 1:20~20:1, a mass percentage of polyvinyl alcohol is 2 wt %~10 wt %.

3. A quantum dot glue comprising a water-soluble red quantum dot material, a water-soluble green quantum dot material, a polyvinyl alcohol, an alkaline compound and water; wherein a pH value of the quantum dot glue is greater than 7.

4. The quantum dot glue according to claim 3, wherein a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %;
    wherein the water-soluble red quantum dot material comprises a red quantum dot and a water-soluble ligand disposed on a surface of the red quantum dot, the water-soluble green quantum dot material comprises a green quantum dot and a water-soluble ligand disposed on a surface of the green quantum dot;
    wherein the red quantum dot comprises a first core in the middle and a first shell coating the first core, a material of the first core comprises one or more than one of CdSe, $Cd_2SeTe$ and InAs, a material of the first shell comprises one or more than one of CdS, ZnSe, $ZnCdS_2$, ZnS and ZnO;
    wherein the green quantum dot comprises a second core in the middle and a second shell coating the second core, a material of the second core comprises one or more than one of $ZnCdSe_2$, InP and $Cd_2SSe$, a material of the second shell comprises one or more than one of CdS, ZnSe, $ZnCdS_2$, ZnS and ZnO;
    wherein the water-soluble ligand comprises one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron and glutathione;
wherein the alkaline compound comprises one or more than one of ethylenediamine, triethanolamine, trimethylamine, diphenylamine, hexamethylene tetramine and tetramethylammonium hydroxide.

5. A quantum dot polarizer comprising a quantum dot glue layer; wherein the quantum dot glue layer is formed by coating a quantum dot glue, the quantum dot glue comprises a water-soluble red quantum dot material, a water-soluble green quantum dot material, a polyvinyl alcohol, an alkaline compound and water, and a pH value of the quantum dot glue is greater than 7.

6. The quantum dot polarizer according to claim 5, wherein the quantum dot polarizer comprises a surface protective film, a first pressure-sensitive adhesive layer, a first protective layer, the quantum dot glue layer, a polarizing film, an adhesive layer, a second protective layer, a second pressure-sensitive adhesive layer and a release film sequentially arranged from top to bottom.

7. The quantum dot polarizer according to claim 5, wherein the quantum dot polarizer comprises a surface protective film, a first pressure-sensitive adhesive layer, a first protective layer, the quantum dot glue layer, a first adhesive layer, a polarizing film, a second adhesive layer, a second protective layer, a second pressure-sensitive adhesive layer and a release film sequentially arranged from top to bottom.

8. The quantum dot polarizer according to claim 5, wherein the quantum dot polarizer comprises a surface protective film, a first pressure-sensitive adhesive layer, a third protective layer, the quantum dot glue layer, a first protective layer, a first adhesive layer, a polarizing film, a second adhesive layer, a second protective layer, a second pressure-sensitive adhesive layer and a release film sequentially arranged from top to bottom.

9. The quantum dot polarizer according to claim 5, wherein a mass percentage of the sum of the water-soluble red quantum dot material and the water-soluble green quantum dot material is 0.5 wt %~20 wt %, a mass ratio of the water-soluble red quantum dot material to the water-soluble green quantum dot material is 1:20~20:1, and a mass percentage of the polyvinyl alcohol is 2 wt %~10 wt %;
wherein the water-soluble red quantum dot material comprises a red quantum dot and a water-soluble ligand disposed on a surface of the red quantum dot, the water-soluble green quantum dot material comprises a green quantum dot and a water-soluble ligand disposed on a surface of the green quantum dot;
wherein the red quantum dot comprises a first core in the middle and a first shell coating the first core, a material of the first core comprises one or more than one of CdSe, $Cd_2SeTe$ and InAs, a material of the first shell comprises one or more than one of CdS, ZnSe, $ZnCdS_2$, ZnS and ZnO;
wherein the green quantum dot comprises a second core in the middle and a second shell coating the second core, a material of the second core comprises one or more than one of $ZnCdSe_2$, InP and $Cd_2SSe$, a material of the second shell comprises one or more than one of CdS, ZnSe, $ZnCdS_2$, ZnS and ZnO;
wherein the water-soluble ligand comprises one or more than one of mercaptoacetic acid, 3-mercaptopropionic acid, cysteine, mercaptoundecanoic acid, mercaptoalkyl oligo(ethylene glycol)carboxylic acid, suger-funtionalized thiol, G2-OH Dendron and glutathione;
wherein the alkaline compound comprises one or more than one of ethylenediamine, triethanolamine, trimethylamine, diphenylamine, hexamethylene tetramine and tetramethylammonium hydroxide.

10. The quantum dot polarizer according to claim 5, wherein a thickness of the quantum dot glue layer is 0.5 µm~200 µm.

\* \* \* \* \*

UNITED STATES PATENT AND TRADEMARK OFFICE
CERTIFICATE OF CORRECTION

PATENT NO. : 9,963,621 B2  
APPLICATION NO. : 15/106317  
DATED : May 8, 2018  
INVENTOR(S) : Dongze Li et al.

Page 1 of 1

It is certified that error appears in the above-identified patent and that said Letters Patent is hereby corrected as shown below:

On the Title Page

Item [72], insert:
--Inventors: Dongze Li, Miao Zhou, Lixuan Chen; Xin Zhang--

Signed and Sealed this  
Fourth Day of February, 2020

Andrei Iancu  
*Director of the United States Patent and Trademark Office*